United States Patent
Nakata

(10) Patent No.: US 8,531,762 B2
(45) Date of Patent: *Sep. 10, 2013

(54) CONFOCAL MICROSCOPE APPARATUS

(75) Inventor: Tatsuo Nakata, Bethlehem, PA (US)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/283,025

(22) Filed: Oct. 27, 2011

(65) Prior Publication Data

US 2012/0038980 A1    Feb. 16, 2012

Related U.S. Application Data

(62) Division of application No. 12/689,523, filed on Jan. 19, 2010, now Pat. No. 8,072,680, which is a division of application No. 11/677,444, filed on Feb. 21, 2007, now Pat. No. 7,675,676, which is a division of application No. 10/393,721, filed on Mar. 21, 2003, now Pat. No. 7,196,843.

(30) Foreign Application Priority Data

Mar. 27, 2002  (JP) .................. 2002-089878

(51) Int. Cl.
G02B 21/06    (2006.01)
G02B 21/24    (2006.01)

(52) U.S. Cl.
CPC ........... *G02B 21/06* (2013.01); *G02B 21/24* (2013.01)
USPC ........................................ 359/385; 359/368

(58) Field of Classification Search
USPC .............................................. 359/368–390
See application file for complete search history.

(56) References Cited

U.S. PATENT DOCUMENTS 5,311,565 A    5/1994    Horikawa
5,675,145 A    10/1997    Toda et al.

(Continued)

FOREIGN PATENT DOCUMENTS

JP    4-125609 A    4/1992
JP    4-353800 A    12/1992

(Continued)

OTHER PUBLICATIONS

Japanese Office Action dated Jul. 21, 2009, and English translation thereof, issued in counterpart Japanese Application No. 2003-086212.

(Continued)

Primary Examiner — Thong Nguyen
(74) Attorney, Agent, or Firm — Holtz, Holtz, Goodman & Chick, PC

(57) ABSTRACT

A confocal microscope apparatus comprises a first optical scanning system which obtains a scan image of a sample using a laser beam from a first laser light source, a second optical scanning system which scans specific regions of a sample with a laser beam from a second laser light source that is different from the first laser light source, thereby causing a particular phenomenon, and a beam diameter varying mechanism which can change the beam diameter of the laser beam of at least one of the first optical scanning system and the second optical scanning system. With this configuration, the apparatus further comprises an excitation light intensity distribution calculator which calculates and stores the excitation light intensity distribution along a depth direction on the sample surface from the beam diameter of the laser beam output from the beam diameter varying mechanism.

5 Claims, 3 Drawing Sheets

(56) References Cited

U.S. PATENT DOCUMENTS

| | | |
|---|---|---|
| 5,731,588 A | 3/1998 | Hell et al. |
| 6,094,300 A | 7/2000 | Kashima et al. |
| 6,449,087 B2 | 9/2002 | Ogino |
| 6,580,518 B2 | 6/2003 | Eda et al. |
| 7,675,676 B2 * | 3/2010 | Nakata .......................... 359/389 |
| 8,072,680 B2 * | 12/2011 | Nakata .......................... 359/389 |
| 2002/0104961 A1 | 8/2002 | Hoffman |
| 2005/0122579 A1 | 6/2005 | Sasaki |
| 2007/0268574 A1 | 11/2007 | Sasaki |

FOREIGN PATENT DOCUMENTS

| | | |
|---|---|---|
| JP | 10-206742 A | 8/1998 |
| JP | 2000-206412 A | 7/2000 |
| JP | 2000-275529 A | 10/2000 |

OTHER PUBLICATIONS

Japanese Office Action dated Jun. 26, 2012 (and English translation thereof) in counterpart Japanese Application No. 2010-158854.

Japanese Office Action dated Apr. 10, 2012 (and English translation thereof) in counterpart Japanese Application No. 2010-158854.

* cited by examiner

CONFOCAL MICROSCOPE APPARATUS

CROSS-REFERENCE TO RELATED APPLICATIONS

The present application is a Divisional Application of U.S. application Ser. No. 12/689,523, filed Jan. 19, 2010, now U.S. Pat. No. 8,072,680, which is a Divisional Application of U.S. application Ser. No. 11/677,444, filed Feb. 21, 2007, now U.S. Pat. No. 7,675,676, which is a Divisional Application of U.S. application Ser. No. 10/393,721, filed Mar. 21, 2003, now U.S. Pat. No. 7,196,843, which is based upon and claims the benefit of priority from prior Japanese Patent Application No. 2002-89878, filed Mar. 27, 2002, the entire contents of all of which are incorporated herein by reference.

BACKGROUND OF THE INVENTION

1. Field of the Invention

The invention relates to a confocal microscope apparatus which excites a specimen which has been marked with a fluorescent dye or fluorescent protein using the excitation wavelength, and detects fluorescence emitted from the specimen.

2. Description of the Related Art

A scanning laser microscope has been proposed, which includes a first optical scanning system for obtaining a scan image of a sample and a second optical scanning system for causing a particular phenomenon in specific areas on the sample surface (refer to Jpn. Pat. Appin. KOKAI Publication No. 2000-275529, the entire contents of which are incorporated herein by reference). In this laser scanning microscope, a specific area on the sample surface is irradiated using a laser light source and an optical path of the first optical scanning system, thus stimulating the sample or a chemical substance injected into the sample. A specific area on the sample surface which is different from the above-mentioned area is excited using a laser light source and an optical path of the second optical scanning system, and the fluorescence is detected, and imaging is carried out. In the specification, unless stated otherwise, an optical scanning system for obtaining images of a sample is called a "first optical scanning system" and an optical scanning system for causing a particular phenomenon in specific areas of a sample is called a "second optical scanning system".

Generally, in the confocal microscope, the focal point on the sample surface and the conjugated focal point thereof are provided before the detection device, and a pinhole is provided therein. Thereby, the resolution of the sample along the depth direction is 1.22 λ/NA, and a smaller confocal effect is being utilized than when a regular microscope is used for observation. There is resolution as a result of this confocal effect, and thus a sharp cross sectional image (that is, an image to obtain a thin slice image along depth direction) can be obtained for the sample which is being scanned.

When the image is taken at a high speed or when a dark sample is being used, the confocal effect is weakened by opening the pinhole (that is, enlarging a diameter of the pinhole), and the image is made bright by lowering the resolution of the fluorescence.

Thus the confocal microscope has the pinhole and decreases the resolution, and thus depth-direction information can be obtained. However, since the focal depth of the sample is determined by the flux diameter of the coherent light which is irradiated on the objective lens, it is impossible to change the focal depth at the pinhole.

Meanwhile, Koehler illumination is often used as the lighting to the sample by the microscope. This Koehler illumination along the thickness direction of the cross section of the sample causes almost uniform excitation.

In the conventional confocal microscope described above, when the apparatus is realized by using 2 laser scanning paths and one objective lens, the excitation light intensity distribution along the depth direction on the sample surface of the laser beam for sample stimulation and the laser beam for obtaining images are almost the same since only wavelength differences are generated.

BRIEF SUMMARY OF THE INVENTION

A confocal microscope apparatus according to a first aspect of the present invention is characterized by comprising: a first optical scanning system which obtains a scan image of a sample using a laser beam from a first laser light source; a second optical scanning system which scans specific regions of a sample with a laser beam from a second laser light source that is different from the first laser light source, thereby causing a particular phenomenon; and a beam diameter varying mechanism which can change the beam diameter of the laser beam of at least one of the first optical scanning system and the second optical scanning system.

A confocal microscope apparatus according to a second aspect of the present invention is characterized by comprising: a first optical scanning system which scans a sample via an objective lens with incoherent light output from an incoherent light source, and detects fluorescence emitted from the sample via the objective lens; and a second optical scanning system which irradiates specific regions of the sample with laser beam output from a laser light source, thereby causing a particular phenomenon, in which the first optical scanning system further comprises a rotatable disk to obtain a confocal effect, the light output from the incoherent source scans the sample via the rotatable disk, and the fluorescence is detected via the rotatable disk.

A confocal microscope apparatus according to a third aspect of the present invention is characterized by comprising: a first optical system which illuminates a sample via an objective lens with incoherent light output from an incoherent light source, and detects fluorescence emitted from the sample via the objective lens; and a second optical scanning system which irradiates specific regions of a sample with a laser beam from a laser light source, thereby causing a particular phenomenon.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be described with reference to the drawings.

First Embodiment

Figure 1:
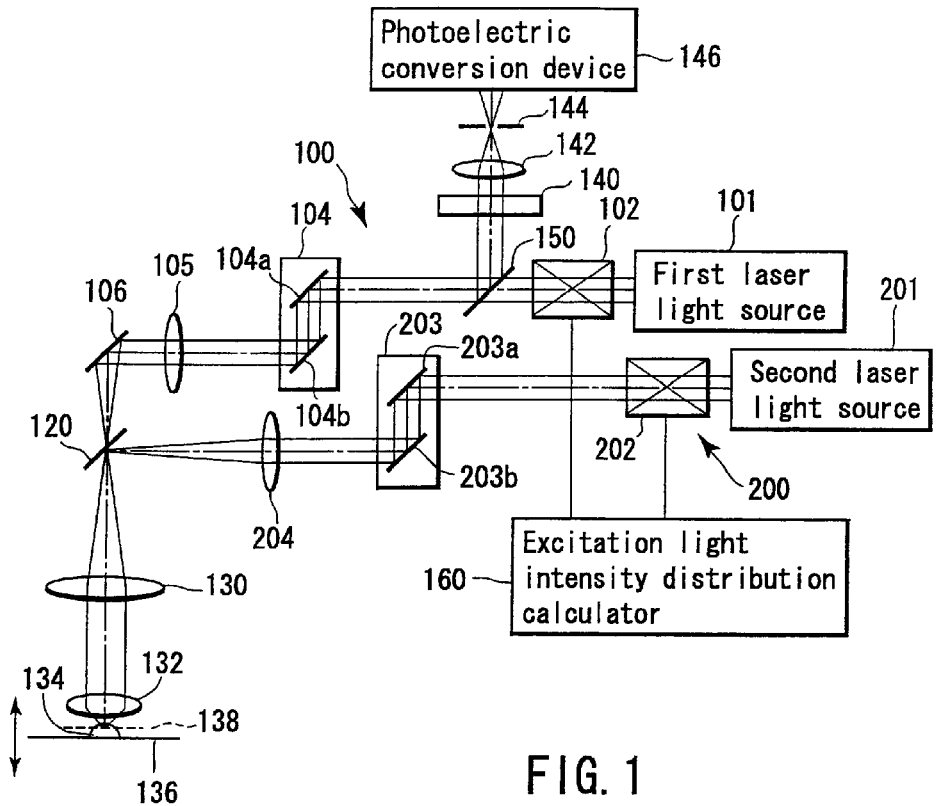
FIG. 1 is a schematic diagram of a confocal microscope apparatus according to a first embodiment of the invention.

FIG. 1 is a schematic diagram of a confocal microscope apparatus according to a first embodiment of the invention.

In FIG. 1, the confocal microscope apparatus comprises: a first optical scanning system 100 for observation (or for obtaining images) which scans a focal surface of a sample 134 with a laser beam from a first laser light source 101; and a second optical scanning system 200 for radiating the laser beam output from the second laser light source 201 onto an optional position on the sample 134, and splitting the caged reagent (i.e. for sample stimulation). An optical path of the first optical scanning system 100 and an optical path of the second optical scanning system 200 meet at a dichroic mirror 120. As a result, the first optical scanning system 100 and the second optical scanning system 200 share an objective lens 132.

In the first optical scanning system 100 and the second optical scanning system 200, the coherent light output from the first laser light source 101 arrives at the dichroic mirror 120 by way of a first beam diameter varying mechanism 102 and a first optical scanning unit 104. Also, the coherent light output from the second laser light source 201 reaches the dichroic mirror 120 by way of a beam diameter varying mechanism 202 and a second optical scanning unit 203.

In addition, the first beam diameter varying mechanism 102 and the second beam diameter varying mechanism 202 are connected electrically or indirectly to an excitation light intensity calculator 160. As a result, the excitation light intensity calculator 160 can obtain beam diameter information of the beams output from the first beam diameter varying mechanism 102 and the second beam diameter varying mechanism 202.

Figure 2:
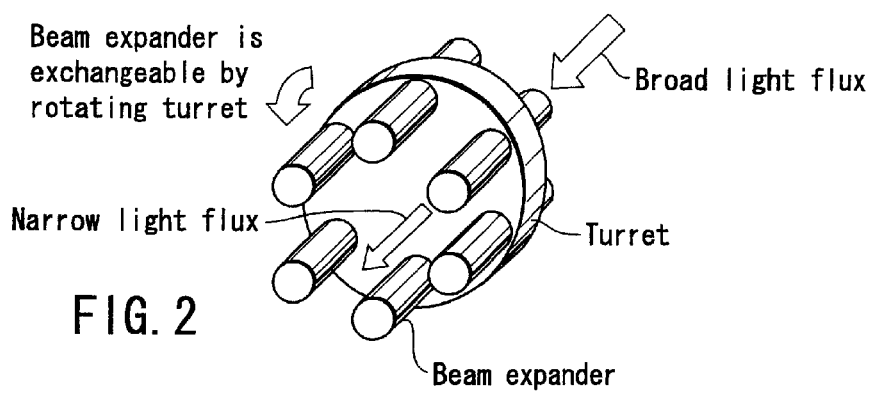
FIG. 2 is a view showing a structural example of a first beam diameter varying mechanism and a second bean diameter varying mechanism.

The first beam diameter varying mechanism 102 and the second beam diameter varying mechanism 202 may include, as shown in FIG. 2, for example, a plurality of mechanisms which change the flux diameter, such as beam expanders, on a rotatable turret. Also, mechanisms in which optical elements such as a plurality of lenses are combined and the flux diameter is changed while the coherence of the laser is maintained (for example, a zoom mechanism) may be adopted as the first beam diameter varying mechanism 102 and the second beam diameter varying mechanism 202.

The operation of the confocal microscope apparatus according to the first embodiment, which has the above-described configuration, will be described.

The first optical scanning system 100 and the second optical scanning system 200 are used for radiating a coherent light at an optional (desired) position on the sample 134. Specifically, this is as described below.

That is, the flux diameter of the coherent light generated from the first laser light source 101 and the second laser light source 201 respectively, are varied (adjusted) with the first beam diameter varying mechanism 102 and the second beam diameter varying mechanism 202.

The light beam output from the first beam diameter varying mechanism 102 passes a dichroic mirror 150, and is arbitrarily deflected to an XY direction by each of scanning mirrors 104a and 104b of the first optical scanning unit 104. The deflected light beam is reflected at the mirror 106 after passing through a relay lens 105, and then irradiated onto the dichroic mirror 120. Meanwhile, the light beam output from the second beam diameter varying mechanism 202 is suitably deflected in an XY direction by each of scanning mirrors 203a and 203b of the second optical scanning unit 203. The deflected light beam passes through the relay lens and is irradiated onto the dichroic mirror 120, and the optical path is deflected at the dichroic mirror 120.

In addition, the coherent light from the dichroic mirror 120 is irradiated onto an image formation lens 130. By changing the flux diameters of the laser beams from the first laser light source and the second laser light source at the first beam diameter varying mechanism 102 and the second beam diameter varying mechanism 202 with respect to the pupil diameter of the objective lens 132, the width of the excitation light distribution (and/or the intensity distribution) along the depth direction on the surface of the sample 134 corresponding to each of the optical scanning systems can be changed.

The light beam that has passed through the image formation lens 130 reaches the objective lens 132, passes through the objective lens 132 and is focused on an arbitrary cross section 138 of the sample 134 which is mounted on a stage 136. The stage 136 is movable along the XY horizontal direction and the height direction (Z axis direction—the direction of the arrow in FIG. 1).

As described above, when the sample 134 is being scanned, in accordance with the application, a particular field may be scanned by each of the scanning mirrors 203a and 203b or it may be kept still and irradiated in spots. Further by skipping each of the scanning mirrors 203a and 203b momentarily, the field can be irradiated in spots at a number of arbitrary positions from moment to moment. Meanwhile, the coherent light generated from the first laser light source 101 is transmitted by the dichroic mirror 150 as described above, and it is deflected by each of the scanning mirrors 104a and 104b of the first optical scanning unit 104.

When light beam is irradiated on the sample 134 by the first optical scanning system 100, the fluorescent marker chemical is excited and fluorescence is generated.

The fluorescence from the sample 134 takes the opposite direction of the optical path of the light irradiated on the sample 134 and passes from the objective lens 132 by way of the image formation lens 130, the dichroic mirror 120, the first optical scanning unit 104, the relay lens 103, each of the scanning mirrors 104a and 104b, and arrives at the dichroic mirror 150. The fluorescence is reflected and incident to a photometry filter 140.

The light beam is incident to the photometry filter 140 and only the fluorescent wavelength from the sample 134 is selected, and the light beam from the sample 134 having only the fluorescence wavelength is focused at a surface of the pinhole 144 by a lens 142. The fluorescence, which has passed through the pinhole 144, is measured by a photoelectric conversion device 146.

The excitation light intensity calculator 160 calculates the excitation light intensity distribution on the sample surface by inputting the information on the beam diameter of the beam output by the first beam diameter varying mechanism 102 and the second beam diameter varying mechanism 202 and the performance (specification) of the objective lens being used at the time. It also has other functions such as outputting values, which have already been stored in a memory, to interfaces such as a computer or a display (not shown in the figure).

According to the confocal microscope apparatus of the first embodiment of the invention as mentioned above, when the sample 134 is observed and recorded by the first optical scanning system 100, by irradiating coherent light on the sample 134 by the second optical scanning system 200, the dynamics (chemical reactions) of sample 134 which are caused by the coherent light irradiation by the second optical scanning system 200 can be adjusted by the first optical scanning system 100.

In this case, in the first embodiment, the excitation light distribution along the depth direction on the sample surface by the first optical scanning system 100 and the second optical scanning system 200 are independently set by the first beam diameter varying mechanism 102 and the second beam diameter varying mechanism 202. Accordingly, even if the excitation light distribution is narrow for the field of the sample being excited by the second optical scanning system, that is, even in the case where a large area of the sample along the thickness direction is excited, by broadening the excitation light distribution of the first optical scanning system, it is possible to carry out observation.

Also, unlike the case described above, at the second optical scanning system, a wide field of the sample along the thickness direction is stimulated, and at the first optical scanning system, the excitation light distribution field along the thickness direction is narrowed, and thus the cross section 138 of the sample can be observed with high resolution.

The first embodiment may be configured such that an IR pulse laser is used as the first laser light source 101, and a fluorescent image is obtained by two photon absorption. In this case, the two photon absorption phenomenon occurs only at the position where the image is formed and theoretically the pinhole 44 is unnecessary. Also, because the dichroic mirror 150 can transmit the IR pulse laser, reflect the visible fluorescence and lead it to the photoelectric converter 146, this embodiment has the property of reflecting short wavelengths. It is also configured such that the beam diameter varying mechanism 102 is not used.

As described above, by using an IR pulse laser as the first laser light source 101, the configuration of the first optical scanning system 100 is simplified. In addition, even in the case where the first beam diameter varying mechanism 102 is not used, the width of the excitation light distribution along the depth direction on the sample surface of the optical scanning system 1 becomes narrow than the excitation light distribution along the depth direction of the second optical scanning system 200 due to the two photon absorption phenomenon. Further, in the case where the thickness of the sample to be stimulated is to be changed, the width of the excitation light distribution of the second optical scanning system 200 can be made smaller by the second beam diameter varying mechanism 202.

Second Embodiment

Figure 3:
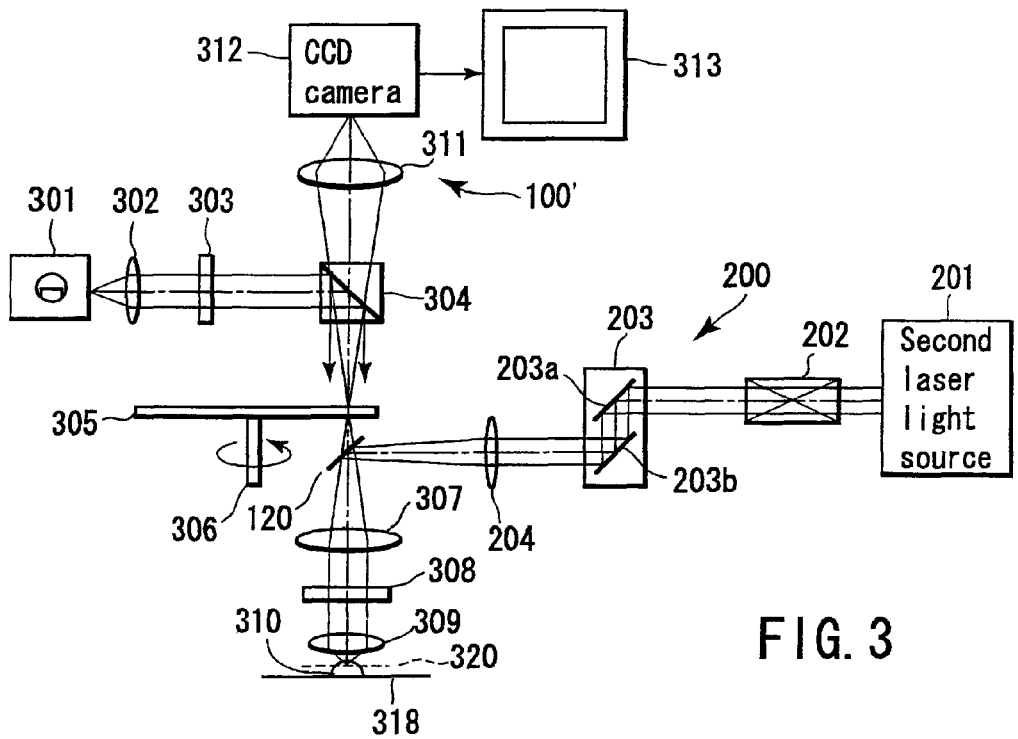
FIG. 3 is a schematic diagram of a confocal microscope apparatus according to a second embodiment of the invention.

A confocal microscope according to a second embodiment of the invention is described with reference to FIG. 3. FIG. 3 is a schematic diagram of the confocal microscope apparatus according to the second embodiment of the invention. The second optical scanning system 200 of FIG. 3 is the same as that of the first embodiment, and has been assigned the same reference numbers and thus detailed descriptions thereof are omitted.

In the second embodiment, a first optical scanning system 100' has an incoherent light source such as a mercury light source, a halogen light source, or an LED light source as a light source 301. An optical lens 302, a polarizing plate 303 and a polarizing beam splitter (PBS) 304 are arranged on an optical path of a light beam emitted from the light source 301.

A rotatable disk 305, a first image formation lens 307, a quarter wave plate 308, and an objective lens 309 are arranged on a reflection optical path of the PBS 304, and a light beam from the light source is incident to a sample 310 by way of these elements.

The rotatable disk 305 is connected to a shaft of a motor (not shown) via a rotation shaft 306, and rotates at a predetermined rotation speed. The rotatable disk 305 has linear transmit portions through which light passes, and linear shield portions which shield light, and the linear transmit portions and the linear shield portions are alternately arranged. In addition, the line width of the shield portion is wider than that of the transmit portion, and for example, the ratio of the width of the shield portion to that of the transmit portion is 1:9 (refer to FIG. 4).

If the width of the portion through which light passes is W, and as is the case with the pinhole, assuming that magnification with which the specimen image is projected onto the disk is M, the wavelength of the light is $\lambda$, and the numerical aperture of the objective lens is NA, $$W = k\lambda M/NA$$

where k is a coefficient and a value in the range of 0.5 to 1 is often used for k.

Also, a CCD camera 312 is arranged on the transmission optical path of the PBS 304 via a second image formation lens 311. A monitor 313 for observing the image taken by the CCD camera 312 is connected to the camera 312.

The operation of the confocal microscope of the second embodiment having the above configuration will be described in the following.

The light beam output from the light source 301 passes through the optical lens 302, and at the polarizing plate 303 it is transformed to linearly polarized light having only a predetermined polarization, and then input into the PBS 304. The PBS 304 reflects the deflected light beam in the direction in which the beam has passed through the polarizing plate and a light in a direction parallel thereto is transmitted.

The light beam reflected at the PBS 304 is input into the rotatable disk 305 which rotates at a predetermined speed. The light beam passing through the transmit portion of the rotatable disk 305 passes through the first image formation lens 307 and becomes circularly polarized at the quarter wave plate 308, and is focused with the objective lens 309 to be irradiated on the sample 310.

The light beam reflected by the sample 310 passes through the objective lens 309, and at the quarter plate 308 it becomes linearly polarized light which is orthogonal to that at the time of input, thereby focusing the image of the sample 310 on the rotatable disk 305, via the second imaging lens 311.

The focused component of the formed image formed on the rotatable disk 305 passes through the transmit portion of the rotatable disk 305. The component passing through the rotatable disk 305 is transmitted by the PBS 304, and arrives at the CCD camera 312 by way of the second image formation lens 311. The specimen image is formed on the image formation surface (image pickup surface).

Figure 4:
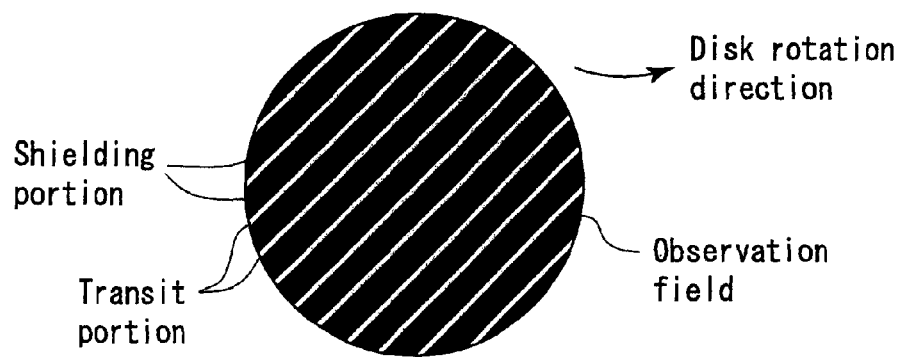
FIG. 4 is a view showing an example of a rotatable disk used in the invention.

If a particular moment when the sample 310 is being observed is considered, a line is projected on the sample 310 along a particular direction as shown in FIG. 4.

In this situation, in the case where the light beam reflected from the sample 310 in this state is focused on the rotatable disk 305, a line is projected on the rotatable disk 305 for the portion of the sample 310 which is in focus. However, for the unfocused portion, the image that is projected on the rotatable disk 305 is blurred, and thus most of the unfocused image cannot be transmitted. Accordingly, only images which are in focus are transmitted to the rotatable disk 305.

When the rotatable disk 305 is not rotating, the situation is not changed and the image is simply one in which the sample and the line overlap. However, by rotating the rotatable disk 305, the line which includes the transmit portion and the shield portion moves while changing its direction on the sample 310, and thus there is uniformity, the line image disappears and an image which is in focus can be observed. Thus, if the rotation of the rotatable disk 305 is sufficiently fast with respect to the exposure time of the CCD camera 312, the focused image can be picked up by the CCD camera 312 and observed at the monitor 313.

For example, if the CCD camera 312 has a TV rate as a usual, the exposure time is 1/60 second or 1/30 second. Therefore, the number of rotations of the rotatable disk 305 during the exposure time should be about 1800 rpm at which half revolutions occur.

The excitation light distribution along the depth direction on the surface of the sample 310 of the first optical scanning system 100' at this time is the same as the light distribution of Koehler illumination of the microscope in the longitudinal direction of the slit. At the width direction of the slit, the distribution is the same as the second optical scanning system.

Accordingly, excitation light distribution along the depth direction on the sample surface of the first optical scanning system is a distribution of which both longitudinal direction and width direction distributions are combined. It is possible to change the excitation light intensity distribution along the depth direction, by varying the width of the slit and the space between the slits of the rotatable disk 305.

In the second embodiment, by detecting the dynamic change which caused reaction of the light radiated by the second optical scanning system which has been shown in the first embodiment using the first optical scanning system 100', the excitation light distribution along the depth direction on the surface of the first and second samples can be different. Accordingly, a wider field of measurement is possible in the first optical scanning system 100' than the stimulation field in the second optical scanning system 200.

Particularly in nervous system measurements, in order to catch movements of the nerve which extend along the thickness direction of the sample, it is necessary to obtain the images with high speed. Usually, with the confocal microscope apparatus, in order to increase the width of the excitation light distribution along the depth direction on the surface of the sample, if the sample is extends along the thickness direction, the image cannot be captured with one measurement. As a result, as in the second embodiment, by reducing the width of the excitation light distribution along the depth direction on the surface of the sample, image measurements for wider fields can be taken. Accordingly, the second embodiment may have a configuration in which the rotatable disk 305 is omitted. Also the rotatable disk is not limited to the structure shown in FIG. 4. Provided that the confocal effect can be obtained, any configuration or structure can be used. For example, the rotatable disk may be one having pinholes formed therein, and it can be a reflection type rotatable disk rather than the transmit type of the above-described embodiment.

In addition, in the second embodiment, the second beam diameter varying mechanism 202 is not necessarily needed. However, if the second embodiment has the second beam diameter varying mechanism 202, it is possible to change the proportion of the first cross section and the second cross section, and by fine adjustment of the field for obtaining images and the portion for stimulation, the degree of freedom of the experiment (and/or observation) is increased. In addition, when the second beam diameter varying mechanism 202 is provided, it is preferable that the excitation light intensity distribution calculator 160 is provided as in the case of the first embodiment.

Also, in the above-described configuration, by the first optical scanning system 100' having an optical microscope system with Koehler illumination, it becomes possible for the image to be obtained in a wider excitation field. In this case, the rotatable disk 305 is unnecessary.

In the above-described second embodiment, the PBS 304 may be replaced with a dichroic mirror. In this case, the light beam from the light source is reflected at the dichroic mirror, and the fluorescence from the sample passes through the dichroic mirror. Thus the optical path of the optical excitation system and that of the optical measurement system can be separated, and as a result the polarizing plate 303 is unnecessary.

Applications of the confocal microscope apparatus of each of the above-described embodiments include for example, the application in the field of cell research in which the cell is locally excited and reactions at the excited regions are observed.

In the method known as the uncaged method, by locally exciting the cell, the concentration of the activated material is changed. When this change in concentration is to be measured, by measuring peripheral portions other than the locally excited regions simultaneously, the internal functions of the cell can be analyzed.

In the photo-bleach method, by locally exciting the cell, the excited regions are discolored. The phenomenon is seen where due to migration of proteins from the periphery, over time color returns to the region which has been discolored. Accordingly, measurements for both the locally stimulated region and the peripheral portions are necessary.

Figure 5:
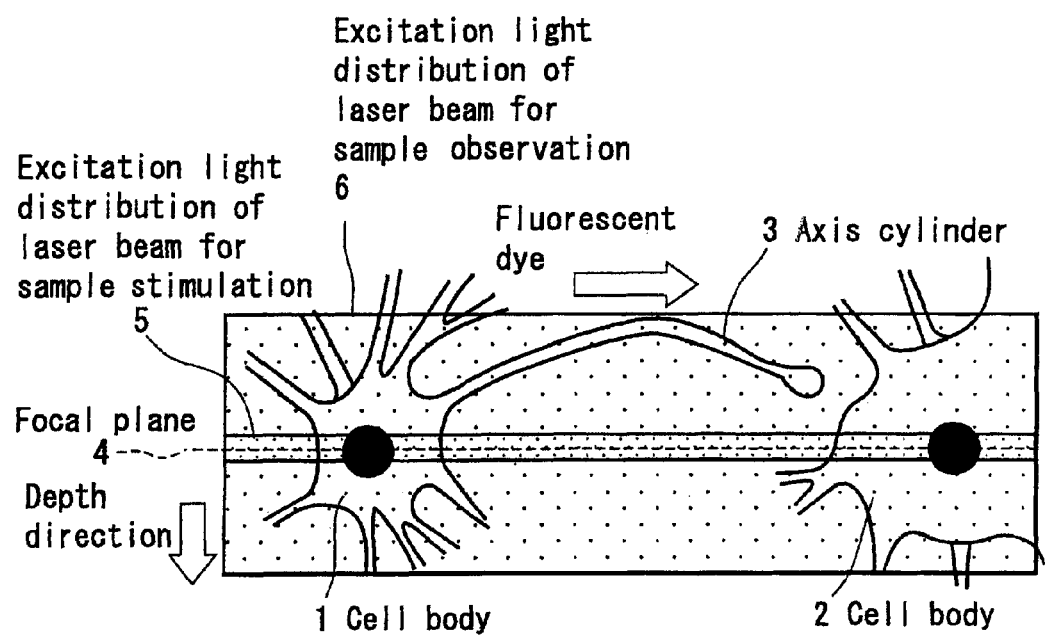
FIG. 5 is a view schematically showing a nerve tissue observation.

An example thereof is shown using FIG. 5. FIG. 5 is a schematic view showing a nerve tissue observation.

For example, when ions transmitted on an axis cylinder 3 from a cell body 1 to a cell body 2 are observed with the caged fluorescent dyes introduced into the cell body 1 as a probe, first a laser beam for stimulating a sample is radiated on a focal point surface 4 of the cell body 1. Next, subsequent changes are observed with a laser beam for sample observation. However, the excitation light intensity distribution of the laser beam for sample observation along the depth direction usually has the same depth as the excitation light intensity distribution 5 of the laser beam for sample stimulation. Thus, in the prior art, the fluorescent dye which transmits the axis cylinder 3 and is not within that distribution field cannot be observed because it is not exposed to excitation light. To the contrary, in each of the embodiments of the invention, the excitation light intensity distribution along the depth direction, of the laser beam for sample stimulation and the laser beam for obtaining images on the surface of the sample are each independently varied, thus solving the problem of the prior art.

The inventions described in the following are extracted from the embodiments described below. The above-described embodiments do not limit the invention. Accordingly various modifications may be made within the scope of the general inventive concept of the invention.

The confocal microscope apparatus according to a first aspect of the present invention is characterized by comprising: a first optical scanning system which obtains a scan image of a sample using a laser beam from a first laser light source; a second optical scanning system which scans specific regions of a sample with a laser beam from a second laser light source that is different from the first laser light source, thereby causing a particular phenomenon; and a beam diameter varying mechanism which can change the beam diameter of the laser beam of at least one of the first optical scanning system and the second optical scanning system. By combining the optical laser system and the laser scanning microscope, it becomes possible to change the width of measurement by using differences in the excitation intensity distribution along the depth direction on the surface of the sample. Specifically, this is done in the following manner.

Conventionally, when movement of the sample is being analyzed, it is of course desirable for the field of excitation and the field for obtaining the images to be different, and also for the excitation light intensity distribution on the sample surface of the laser beam for sample stimulation along the depth direction and the excitation light intensity distribution on the sample surface of the laser beam for obtaining images along the depth direction to be different from each other. In addition, it is desirable for the width of the excitation light intensity distribution along the depth direction to be intentionally made small.

In the first aspect, a beam diameter varying mechanism for changing the beam diameter of the laser beam is provided to the output exit for the laser beam of each of the optical scanning systems. When the flux diameter is reduced by this beam diameter varying mechanism, the numerical aperture of the objective lens is smaller than in the case where the flux diameter is large. Consequently, the width of the excitation light intensity distribution along the depth direction on the surface of the sample can be reduced without changing the objective lens. Further, by providing each of the optical systems with the beam diameter varying mechanism, the excitation light intensity distribution along the depth direction of the sample surface of each of the optical systems can be changed independently. Also, the excitation light distribution along the depth direction on the sample surface can be changed intentionally.

The confocal microscope apparatus according to a second aspect of the present invention is characterized by comprising: a first optical scanning system which scans a sample via an objective lens with incoherent light output from an incoherent light source, and detects fluorescence emitted from the sample via the objective lens; and a second optical scanning system which irradiates specific regions of the sample with laser beam output from a laser light source, thereby causing a particular phenomenon, in which the first optical scanning system further comprises a rotatable disk to obtain a confocal effect, the light output from the incoherent source scans the sample via the rotatable disk, and the fluorescence is detected via the rotatable disk. The optical laser system and the disk type confocal microscope apparatus are combined, so that it becomes possible to change the width for measurement due to differences in the excitation intensity distribution along the depth direction on the surface of the sample.

The confocal microscope apparatus according to a third aspect of the present invention is characterized by comprising: a first optical system which illuminates a sample via an objective lens with incoherent light output from an incoherent light source, and detects fluorescence emitted from the sample via the objective lens; and a second optical scanning system which irradiates specific regions of a sample with a laser beam from a laser light source, thereby causing a particular phenomenon. The optical laser system and the microscope of Koehler illumination are combined, so that it becomes possible to change the width of measurement due to differences in the excitation intensity distribution along the depth direction on the surface of the sample.

Preferred embodiments of the confocal microscope described above are as described in the following. Each of the embodiments may be used alone or may used in combination.

(1) The second optical scanning system further comprises a beam diameter varying mechanism, which changes a beam diameter of the laser beam of the laser light source.

(2) An excitation light intensity distribution calculator which calculates and stores the excitation light intensity distribution along a depth direction on the sample surface from the beam diameter of the laser beam output from the beam diameter varying mechanism is further provided.

(3) The first laser light source is an IR pulsed laser, and the beam diameter varying mechanism is provided to the second scanning optical system.

(4) In (3), a depth direction intensity distribution calculator which calculates an intensity distribution along a depth direction of the laser light beam output from the beam diameter varying mechanism on the sample surface is further provided.

(5) The incoherent light source includes a lamp or an LED light source.

The observation method according to the fourth aspect of the invention is characterized by comprising: irradiating an excitation light to a sample to excite the sample; irradiating an light to cause the particular phenomenon to a desired position; and imaging by detecting a light from the excited sample, in which said irradiating the excitation light includes adjusting an intensity distribution of the excitation light along a depth direction on the surface.

The observation method according to the fifth aspect of the invention is characterized by comprising: irradiating an excitation light to a sample to excite the sample; irradiating an light to cause the particular phenomenon to a desired position; and imaging by detecting a light from the excited sample, in which said irradiating the sample includes adjusting an intensity distribution of the light to cause the particular phenomena along a depth direction on the surface.

The observation method according to the sixth aspect of the invention is characterized by comprising: irradiating an excitation light to a sample via a rotatable disk to acquire a fluorescent image of the sample by a disk scanning; and irradiating an light to cause the particular phenomenon to a desired position. With this configuration, it is preferable that the irradiating the light includes adjusting an intensity distribution of the excitation light along a depth direction on the surface.

According to the present invention, by independently changing the intensity distribution along the depth direction on the sample surface of the excitation light in the optical system for sample excitation and for obtaining images, it becomes possible to do dynamic analysis of different three-dimensional spaces.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A microscope apparatus comprising:
 a first optical system which illuminates a sample via an objective lens with incoherent light output from an incoherent light source, and detects fluorescence emitted from the sample via the objective lens; and
 a second optical system which irradiates specific regions of the sample with a laser beam output from a laser light source, thereby causing a particular phenomenon;
 wherein the first optical system comprises a Koehler illumination optical system;
 wherein the second optical system comprises an optical scanning mechanism; and
 wherein a depth position of a focal plane of the second optical system is substantially the same as a depth position of a focal plane of the first optical system.

2. The microscope apparatus according to claim 1, wherein the second optical system comprises a beam diameter varying mechanism which changes a beam diameter of the laser beam of the laser light source.

3. The microscope apparatus according to claim 2, further comprising an excitation light intensity distribution calculator which calculates and stores an excitation light intensity distribution along a depth direction on a surface of the sample from the beam diameter of the laser beam output from the beam diameter varying mechanism.

4. An observation method using a microscope, the method comprising:
 irradiating an excitation light to a sample via an optical system including a Koehler illumination optical system to acquire a fluorescent image of the sample; and
 irradiating a laser light to cause a particular phenomenon at a desired position;
 wherein a depth position of a focal plane of the irradiated excitation light is substantially the same as a depth position of a focal plane of the irradiated laser light.

5. The observation method according to claim 4, wherein the irradiating the laser light comprises adjusting an intensity distribution of the laser light along a depth direction on a surface of the sample by changing a beam diameter of the laser light.

* * * * *